(12) United States Patent
Mishra et al.

(10) Patent No.: US 9,424,323 B2
(45) Date of Patent: Aug. 23, 2016

(54) APPLICATION TIER DATA DICTIONARY

(75) Inventors: AMulya Mishra, Orissa (IN); Vinoth Kumar Rajasekaran, TamilNadu (IN); Alan Fothergill, Half Moon Bay, CA (US); Oliver Steinmeier, San Mateo, CA (US); Kenichi Mizuta, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1074 days.

(21) Appl. No.: 12/023,798

(22) Filed: Jan. 31, 2008

(65) Prior Publication Data

US 2009/0198709 A1    Aug. 6, 2009

(51) Int. Cl.
  *G06F 17/30*  (2006.01)
  *G06F 9/44*  (2006.01)

(52) U.S. Cl.
  CPC ............ *G06F 17/30569* (2013.01); *G06F 8/71* (2013.01)

(58) Field of Classification Search
  USPC ................................ 707/999.1–102, 769, 770
  See application file for complete search history.

(56) References Cited

U.S. PATENT DOCUMENTS

| | | | |
|---|---|---|---|
| 5,278,979 A * | 1/1994 | Foster et al. | |
| 5,960,200 A * | 9/1999 | Eager et al. | 717/147 |
| 6,539,396 B1 * | 3/2003 | Bowman-Amuah | |
| 6,954,220 B1 * | 10/2005 | Bowman-Amuah | 715/741 |
| 7,206,805 B1 * | 4/2007 | McLaughlin, Jr. | 709/203 |
| 7,363,633 B1 * | 4/2008 | Goldick et al. | 719/328 |
| 8,090,754 B2 * | 1/2012 | Schmidt et al. | 707/726 |
| 8,595,093 B2 * | 11/2013 | Greenaae et al. | 705/30 |
| 2005/0102319 A1 * | 5/2005 | Hoeft et al. | 707/103 Y |
| 2005/0132356 A1 * | 6/2005 | Cross et al. | 717/174 |

* cited by examiner

*Primary Examiner* — Hung Q Pham
(74) *Attorney, Agent, or Firm* — Marger Johnson

(57) ABSTRACT

A method of tracking dependencies in an application file, including analyzing the application file to identify at least one dependency in the application file, extracting information from the application file related to the dependency to allow identification of an entity to which the application file has a dependency from the information, and storing the dependency for the application file in the application tier data dictionary. A system has a memory, at a first tier, to store an application tier data dictionary and at least one application file, and a processor at the first tier to determine dependencies in the application file, store the dependencies in the application tier data dictionary, communicate with a second tier, separate from the first tier, as needed to access information with regard to the dependencies, and store the information in the application tier data dictionary.

20 Claims, 5 Drawing Sheets

APPLICATION TIER DATA DICTIONARY

BACKGROUND

The field of this disclosure relates to a multi-tier database architecture.

Java™ 2 Platform, Enterprise Edition (J2EE) is a widely used platform specification for server programming in the Java™ language. J2EE has been renamed to Java™ EE 5.0 in the newest version of the specification. The previous version was named J2EE 1.4. This discussion will refer to any version of the enterprise editions of Java™ as Java™ EE.

The Java™ EE Platform has additional libraries added to the Java Standard Edition platform that provide functionality to deploy fault-tolerant, distributed, multi-tier Java software, based largely on modular components running on an application server. Typically, large entities using mainframe-scale computing deploy Java™ EE in a multi-tiered architecture.

A multi-tiered structure generally consists of a three-tier structure, although two-tier structures are included for purposes of this discussion. A first tier contains the client. A second, middle or application tier, contains the Java™ EE containers, applications and their services. A third tier contains the enterprise information system, or database, tier, having such components as databases and legacy applications. An application tier Java™ EE application will generally require finding all of the dependencies among components, such as Java™ files, XML files, and Database Objects, such as table, synonym, etc. Finding all of these dependencies may require multiple calls from the application tier to the database tier. These multiple calls make tracking the dependencies and the maintainability of the applications, more difficult and time consuming.

DETAILED DESCRIPTION OF THE EMBODIMENTS

Figure 1:
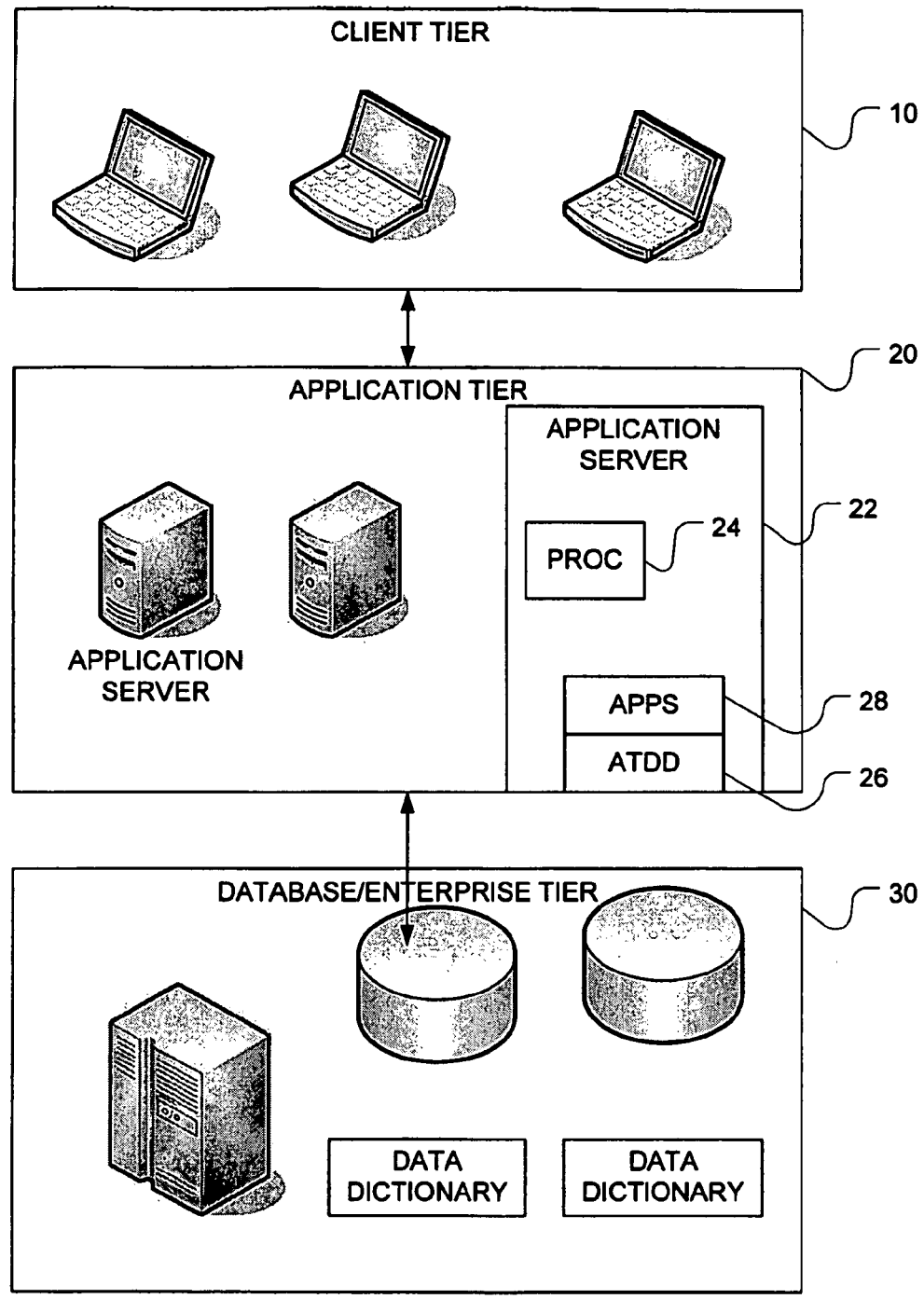
FIG. 1 shows an example of a multi-tiered database system.

FIG. 1 shows an embodiment of a multi-tiered database system. Generally, these systems have a client tier 10, a middle or application tier 20 and a database or enterprise tier 30. The discussion here will use the example of a three-tier system, where the middle tier and the application tier are the same tier. However, no limitation is intended by this example, nor should any such limitation be implied.

For example, in the possibly more common two-tier system, the client tier would also include the application tier, as that tier executes the application that interacts with the database in the database tier. The database tier handles all of the functions necessary to allow the client concurrent, shared access to a database. The application tier, which existed as the middle tier in the three-tier system, would exist in the client tier in a two-tier system. Therefore, it is more appropriate to refer to the middle tier of the three-tier system as the 'application tier,' as it may also apply to two-tier systems.

The applications tier executes applications, each of which may have multiple dependencies. A 'dependency' as used here is a connection between an application and some other entity, such as a data source or database object; other application file; or a supplemental or associated file, such as a related XML (eXtensible Mark-up Language) file. The connection may be a file association, a shared directory, a program call from within the application file, etc.

For purposes of the discussion here, an example of a Java™ application file will be used, operating in the enterprise versions of Java™, such as J2EE or Java™ EE 5.0. However, the implementations described here would apply to any language or application environment that relies upon dependencies to operate. Because of its operating system independence, however, the structure of the Java™ environment lends itself well to understanding of the embodiments described here.

An issue may arise with applications files that rely upon dependencies. Whenever a change occurs with regard to the application file, the programmer should confirm that all of the dependencies still hold true, and that any changes needed in the dependent entities occur as well. If one does not confirm the dependencies, calls to incorrect dependent entities may result in the application failing, or result in instability of the ACID (Atomicity, Consistency, Isolation and Durability) properties of the database.

Currently, tracking the dependencies requires multiple calls from the applications tier to the database tier, which consumes more time than desirable, and increases the load on the database tier. The calls to the database tier generally access various data dictionary tables to determine the details of database objects in those tables.

A data dictionary, sometimes referred to as a system catalog, is a repository of all of the meta-data relevant to the objects in the database and information related to the database management system itself. The data dictionary is generally very extensive, and repeatedly calling to it for individual dependencies causes delays in the system. Further, some of the dependencies, such as between the Java files, may not exist in the database tier data dictionary.

Using the methods discussed here a system can utilize a middle, or application, tier data dictionary to track dependencies with regard to application files. In FIG. 1, the applications tier consists of several application servers, such as 22. Each application server has access to a processor 24, which in turn has access to a memory 26. Applications 28 to be executed by the processor may reside in the memory 26. The application tier data dictionary 30 may reside there as well.

One should note that while the processor resides within applications server 22, various configurations may also occur. The applications tier may have only one physical computer with a processor and memory, but that computer may have running on it several different servers, applications and the application tier data dictionary. Similarly, the memory containing the application tier data dictionary may reside in a different physical machine than the processor operating upon it, or may even been distributed across several memories within the application tier.

Similarly, the discussion may refer to the application tier data dictionary 'storing' the dependencies, where the dependencies themselves may not actually be stored. That is, no entry in the memory may exist that identifies the application file by name and a list of its dependencies. This could occur. The system would more likely store a query related to a particular application file and then run the query when the system needed to determine the dependencies with regard to that file. When a query does run that brings new information into the application tier data dictionary, the application tier data dictionary will store that information, as will be discussed in more detail later.

Figure 2:
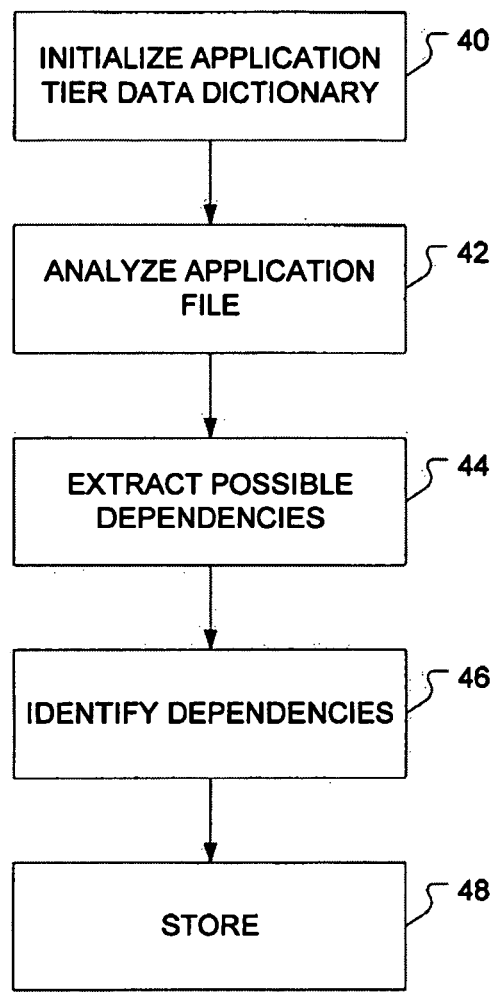
FIG. 2 shows a flowchart of an embodiment of a method to track dependencies in an application file.

FIG. 2 shows an embodiment of a process to track dependencies in an application file. The process begins at 40 with the system initializing the application tier data dictionary. As will be discussed in more detail further, the system may populate the application tier data dictionary with information from at least one database tier data dictionary. This will allow any query as to dependencies for database objects to operate mostly at the application tier and will hopefully avoid a majority of the calls that would otherwise occur to the database tier.

Generally, this process will be embodied in computer-readable instructions stored on computer-readable media for execution by a processor, such as processor 24 of FIG. 1. The execution of these instructions may be user-instigated, where a user launches the process, or may be automatically started, based upon a trigger condition. Trigger conditions may include updates to a version of the application software, such as an upgrade to Java™ EE, the database software, such as Oracle® 11g, or other such events. Trigger conditions may also include those dictated by other applications or software that are bundled with this utility.

In this embodiment, the system tracks dependencies for a particular application file, such as a Java™ file. The system would analyze the application file at 42 for dependencies between the Java™ file and various entities, including database objects, between the Java™ file and any other Java™ files, and between the Java™ file and any associated XML files. Various indicators in the file will cause the system to extract the information related to the possible dependencies, such as extraction of strings to allow identification of the type or types of dependencies within the application file. The types of dependencies may be between the application file and one or more of other application files, database objects/synonyms, or associated files, such as XML files. Extraction of strings would allow the system to identify possible database object/synonym dependencies, extraction of import and method calls would allow the system to identify application file dependencies, and extraction of data sources would allow the system to identify associated file dependencies. This information will be referred to collectively as information related to possible dependencies.

Once the information related to the possible dependencies has been extracted, the system may access the application tier data dictionary to identify whether or not a dependency exists for a database object. If it does exist, the dependency would be identified, such as by identification of the database object/synonym, other application file, or associated file, with which the dependency exists. These will be referred to collectively as the entities with which the application file may have a dependency.

The system would then provide some sort of storing of the dependencies detected in the application file at 48. This storing may involve storing the query, storing a results list associated with the data file, or providing a printed or displayed list to a user that may have generated the query as to dependencies. If the process functions automatically, the system may use the identification to run further processes to update or remove dependent entities.

As mentioned above, this discussion refers to the storage of these dependencies at 48. Storing may involve updating the application tier data dictionary to include information on dependencies not previously known prior to the analysis of this particular application file. Storing may also consist of storing the query associated with this particular application file for later execution when an update becomes needed.

The dependencies contained in a particular application file may include dependencies to various entities, such as a data source or database object, other application file, such as Java file to Java file, or a supplemental or associated file, such as an XML file. FIGS. 3-6 discuss various embodiments of determining and storing these dependencies in an application tier data dictionary to allow faster dependency analysis for application files.

Figure 3:
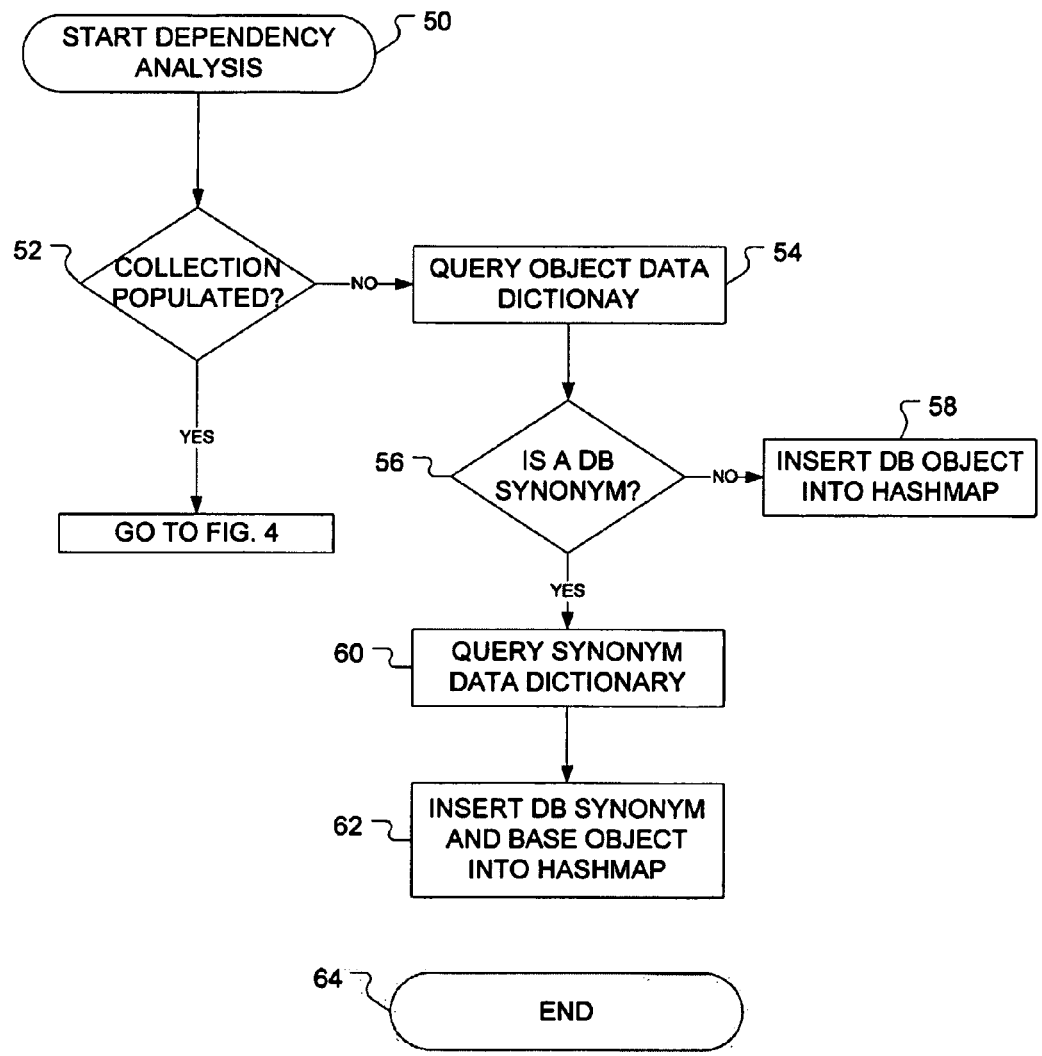
FIG. 3 shows a flowchart of an embodiment to populate an application tier data dictionary.

In order for the system to provide an analysis of the database object/synonym dependencies, the application tier data dictionary would need to contain information with regard to at least some of the entities for which dependencies are checked. In this embodiment, the system would populate the application tier data dictionary with an initial population extracted from the database tier. FIG. 3 shows one embodiment of this process for determining database object dependencies.

In FIG. 3, the embodiment determines if the application tier data dictionary is populated upon execution of a query. As an alternative, the system could populate the application tier data dictionary upon system initialization or at any point prior to a query. In this embodiment, the query revolves around some possible database object. The specific example used here relies upon an Oracle® database, and as such data dictionaries specific to Oracle® databases are used. However, the analogies to these databases in other, non-Oracle systems, could be used.

The application tier data dictionary may be organized in several different ways. In this example, the application tier data dictionary includes two hashmap collections related to database objects/synonyms. One collection contains data from the database object data dictionary, and may be referred to here as the object hashmap collection. The other collection contains data from the database synonym data dictionary, and may be referred to here as the synonym hashmap collection.

In the example of FIG. 3, if the system determines that the collections have not been populated at 52, the process queries the ALL_OBJECTS data dictionary in an Oracle® database at 54. The ALL_OBJECTS data dictionary describes all objects in the database accessible to the user in an Oracle® database; most databases have a similar data dictionary.

When the database object data dictionary is queried at 54 only the row of the database data dictionary relevant to the current object is accessed, in one embodiment. If the object type is SYNONYM, the USER_SYNONYM data dictionary would be queried at 58. The USER_SYNONYM data dictionary is that dictionary that contains all of the synonyms for that user.

If the object type is SYNONYM, the database synonym data dictionary would be queried at 60. In this embodiment, the row of the database synonym data dictionary would be retrieved and entered into the synonym hashmap collection of the application tier data dictionary at 62, as well as the details of the base object to which the synonym refers. If the object type is not SYNONYM, the row of the database data dictionary is inserted into the object hashmap collection of the application tier data dictionary at 58. The process ends at 64.

Generally, the two collections are stored as hashmap collections. A collection in Java™ is an object that groups multiple elements together into a single unit. In Java™ they are sometimes referred to as containers. Typically, a collection represents data items that form a natural group, such as a phone directory, or in this case, a collection of rows from the database tier data dictionaries. A map is essentially a look up table that contains data pairs, one is a key and the other is a data value. A hashmap is a map that is not ordered, and a hashmap collection is a grouping of hashmaps. Using the object name as a key the details about the object can then be accessed from the hashmap collection.

Returning to FIG. 3, the hashmap collection receives the row from the USER_SYNONYM data dictionary if the object is of type SYNONYM. If the object is not of type SYNONYM, the hashmap collection would receive a row from the ALL_OBJECTS data dictionary. Generally, the two data dictionaries would have separate hashmap collections corresponding to them in the application tier data dictionary.

In a more general process, the application tier data dictionary would initially be populated with the hashmap collections ALL_OBJECTS, or its analogy in a non-Oracle system, and USER_SYNONYM, or its analogy in a non-Oracle system. The initial population of the hashmap collections provides a starting point for queries about dependencies of an application file.

Returning to FIG. 3, this process assumed that the collections in the application tier data dictionary were not populated. If the collections were populated at 52, the process moves to FIG. 4.

Figure 4:
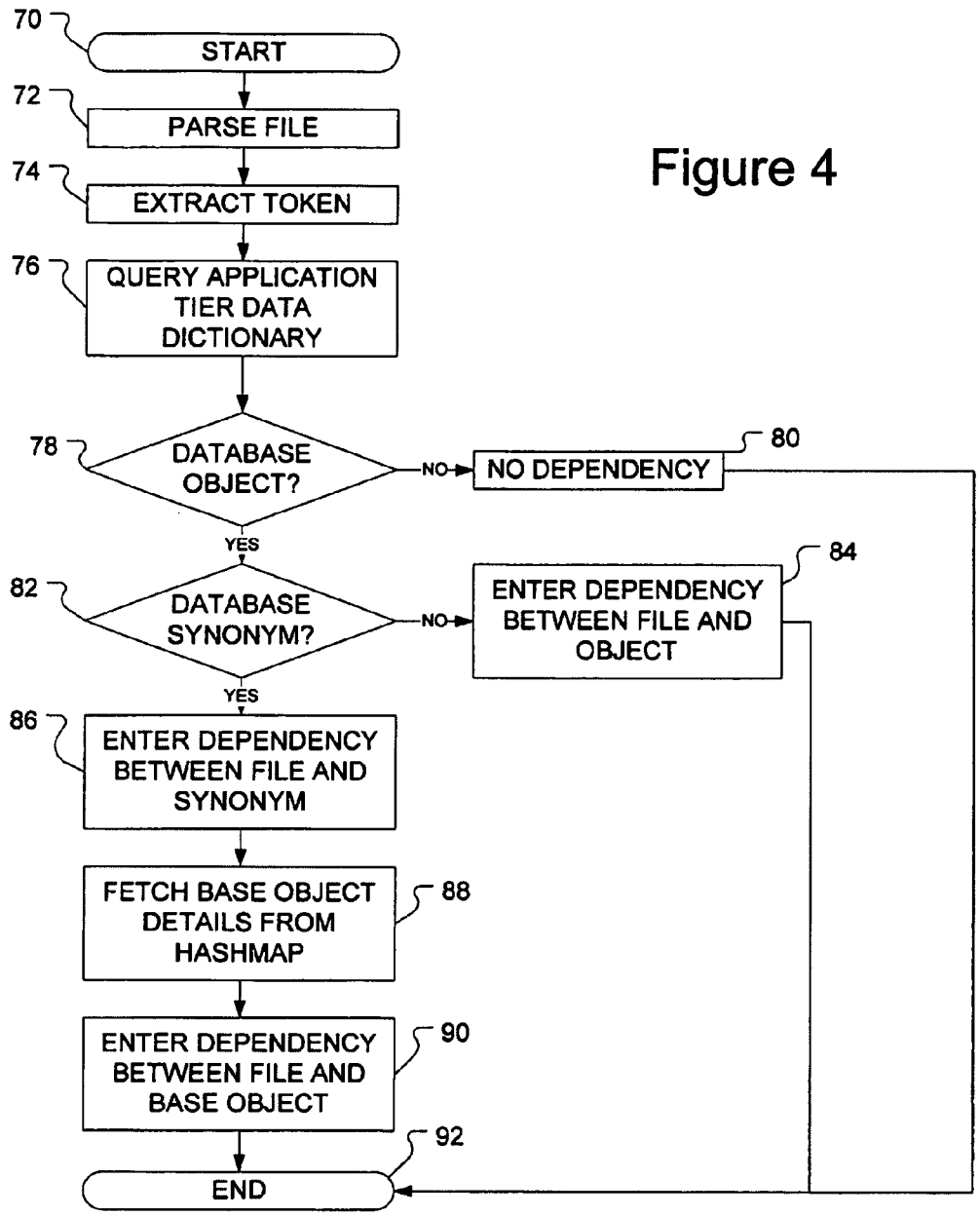
FIG. 4 shows a flowchart of an embodiment of a method to determine a dependency between a database object and an application file for storage in an application tier data dictionary.

FIG. 4 shows a flowchart of an embodiment of a query about dependencies between an application file and database objects using the application tier data dictionary. The process starts at 70 when an application file becomes the subject of a dependency analysis. This may result from a user-instigated dependency analysis, when a programmer wants to update dependencies because of a change made to the application file, the application software is updated to a new version, etc. The process may also start automatically due to a triggering event, such as an update to the database software, table structure, etc.

When the process encounters the first Java file, it queries the ALL_OBJECTS data dictionary, or whatever analogous data dictionary exists in the system, and the result set of the query will be stored in the Java collection as hashmap. Two collections have been discussed, but it is possible to have only one or more than two collections, as well.

At 72, the process parses the application file. Generally, application code has some identifier to allow identification of objects in the code. For example, in Java™, most of the Structured Query Language (SQL) and for Oracle-specific applications, Procedural Language/SQL (PLSQL) calls used inside the Java™ file use a string notation contained in quotes, e.g., ". . .".

This process may require a parser, as the SQL statements may have a dynamic construction, where the data source for a particular string does not appear in the string until run time. For example, in the definitions:

```
String sql = "Select * from";
String dsource = "Emp";
Sql += dsource;
``` the value of sql at runtime is "Select * from Emp." Just parsing the file for strings would not have identified this value for the string. This analysis of the value of the strings at run time will be referred to here as tokenizing. After the file is parsed, the tokens are extracted at 74.

For a specific example, one could use JFlex, an open source lexical analyzer, filters all of the strings enclosed in double quotes and tokenizes them. JFlex has a grammar that allows it to extract the string in double quotes. The above string "Select * from Emp" would be extracted and then tokenized. For the above example, there would be a token for each of the words 'Select,' 'from,' and 'Emp.' Each of these would be analyzed individually to determine if it was a database object or not.

The process then receives the token to determine if it is a database object at 76. For example, the token 'Select" would be used as a potential database object, and the application tier data dictionary would be queried at 76 using the token as a key into the hashmap collections to determine if it is a database object.

Using the example discussed above, the hashmap key and values may look like this.

```
"EMP" - > "Table"
"Emp_S" -> "Synonym"
"EMP_V" -> "View"
"Emp_P" -> "Package"
```

In the above example the key of the hashmap is "EMP", "EMP_S" and the corresponding values can be the DB Object type, as shown above, or it can be a Java object. In the case of a Java object, the further details like owner, type, etc., about the DB Object "EMP" can be stored in a Java object and the hashmap stores the reference to this object as the value, as shown below:

```
"EMP"->OBJ1
"EMP_S"->OBJ2
OBJ1:
Name :EMP
Type:Table
Owner:scott
base object name: none
base object type: none
OBJ2:
Name :EMP_S
Type:Synonym
Owner:scott
base object name: EMP
base object type: Table
```

Once the collection is populated with this, the system finds all the string present in the Java file like "Select * from emp_s" and tokenize it as "select" "*" "from" "emp_s."

```
find if "select" is in hashmap as it is
    if not ignore it.
find if "*" is in hashmap as it is
    if not ignore it.
find if "from" is in hashmap as it is
    if not ignore it.
find if "emp_s" is in hashmap
    yes it is
        then find the details about this object and track it as a dependency.
```

The Java file has dependency with EMP_S a synonym. From OBJ2 one can find the se object of this synonym also and track this one also as a dependency. Java file has dependency with EMP table as well.

From the above, it can be seen that the token is checked to determine it is a database object at 78. If the token is not a database object at 78, there is no dependency at 80 and the process ends for that token at 92. If the token is a database object at 78, it is checked to determine if it is a synonym at 82.

This may result in checking synonym hashmap collection, if used, or checking the database object type in a single database object hashmap collection. If the token is not a synonym, the database object dependency is entered into the application tier data dictionary at 84, and the process ends for that token at 92.

The dependencies are 'entered' into the application tier data dictionary in such a manner so as to be identifiable by the application file to which that dependency relates. This may include a table organized by application file names, each application file having a record that maintains a list of the dependencies for that application file.

If the token represents a synonym, the dependency between the synonym and the file is entered into the application tier data dictionary at 86. At 88, the details related to the 'base' object for which the token is a synonym is retrieved from the synonym hashmap collection and the dependency between the file and the base object is entered at 90. This process then ends for that particular token at 92. In this manner, dependencies between database objects and synonyms are tracked for the application file.

An example of pseudo code used in an application tier data dictionary is given below:

```
If the collection is not populated
    Query the ALLOBJECT Data Dictionary
    Get the Row
    If the OBJECT_TYPE is not a SYNONYM
        Insert the row details into AllDBObjectsInfo Collection.
    Else if the OBJECT_TYPE is SYNONYM
        Query the USER_SYNONYM Data Dictionary for the
        given SYNONYM
        Get the Row
        Insert the row details into UserDBSynonymsInfo Collection.
    End If
Else
    Get the passed token sToken
    If the token contains "." tokenize it and set the first token as
    sToken.
    // This is for Package.Procedure calls
    Search sToken in AllDBObjectsInfo
    If found
        If sToken is a PACKAGE
            Also Query the USER_DEPENDENCIES Data Dictionary
            for sToken.
            Get the result set
            There is a dependency between the Java file and the
all the objects listed in the
            result set.
        End If
        There is a dependency between the Java file and the Database
        Object sToken.
    Else if not found
        Search the passed sToken in UserDBSynonymsInfo
        If found
            Then there is a dependency between the Java file and the
            Synonym sToken.
        Else
            The passed token sToken is not an Oracle Database Object
        End If
    End If
End If
```

In addition to tracking dependencies between the application file and database objects, the application tier data dictionary may track dependencies between the application file and other application files. For example, a first Java™ file may have a dependency with another Java™ file.

Figure 5:
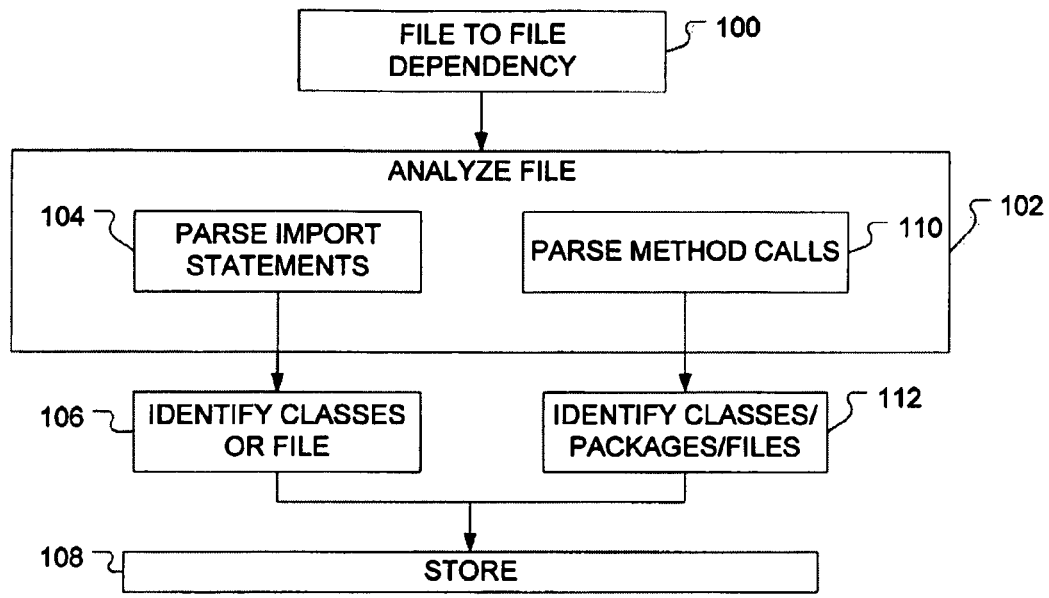
FIG. 5 shows a flowchart of an embodiment of a method to determine dependencies between an application file and another application file for storage in an application tier data dictionary.

Generally, when an application file uses another application file giving rise to a dependency the first application file imports the other application file. FIG. 5 shows a flowchart of an embodiment of a process to determine file to file dependencies. The process starts at 100, either started by a user or automatically, as mentioned above.

The process analyzes the file at 102. Analysis of the file may take several different paths, two of which are shown in FIG. 5 to determine file to file dependencies. Analysis of the file could result in the file being parsed at 104 to locate 'import' statements in which other files are imported into the current file. The parsing would allow the system extract the file and class names at 106. For example, in Java™ a file is analogous to a class. The classes or files being imported could be identified at 106. The application file would then have a dependency with the classes identified at 106 and the dependency is added to the application tier data dictionary at 108.

Alternatively, analysis of the application file may parse the file to identify method, or subroutine, calls at 110. The pattern may take the form of <X.Y>, where X could be a reference to the class within the same package, X could be a package being imported, or X could be an inner class. Further Y could be a static subroutine or method and X could be a name of a class. The process identifies these at 112. The identified classes would have a dependency with the current application file that is added to the application tier data dictionary at 108.

Figure 6:
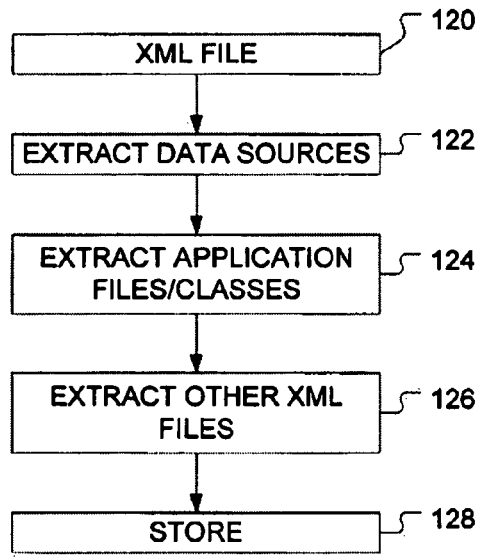
FIG. 6 shows a flowchart of an embodiment of a method to determine dependencies between an application file and another file for storage in an application tier data dictionary.

Another set of dependencies may involve dependencies between the application files and associated files, such as XML files. FIG. 6 shows a flowchart of an embodiment of a method to identify these dependencies. The process begins with identification of the file associated with an application file at 120, in this case an XML file. As will be discussed in more detail further, the process could also use an XML file as an application file.

In the XML file, attributes can be defined that refer to data sources, application files and other XML files. The specific attributes used could be provided to the system for identification upon analysis of the XML file, or a parser to look for particular attributes could be used.

In one embodiment, a root node "Entity" would have an attribute "DBObjectName," which refers to a specific database view. The parser could be programmed to look for such terms as "DBObject," or other variations, etc., to extract data sources with which the application file has a dependency at 122.

For XML files that refer to application files such as Java files, the parser could search for text related to definitions of classes, since Java™ files are referred to as classes. Class definitions, such as "RowClass=..." could be used to identify Java™ classes with which the current application file, or Java™ class, has a dependency at 124.

Other XML files could be identified by "ViewObjectName." These identified entities within an XML file associated with an application file would have dependencies with the application file at 126. These dependencies, including those listed above, would be added to the application tier data dictionary at 128.

In this manner, the dependencies necessary for maintaining relationships among components for an application file can be maintained. Upon execution of the process, either started manually, or done automatically upon a triggering event, the process would identify the dependencies for a particular application file. The first time the process executes for a particular application file, the application tier data dictionary may need to be updated to include information gathered from the previously-unknown or un-processed dependencies. Further tracking of dependencies for that file should be able to refer only to the application tier data dictionary rather than having to make calls to the database tier data dictionaries.

In addition, the application tier data dictionary builds itself. Ideally, even never-previously analyzed application files would not need to call the database tier data dictionaries to determine database object dependencies.

The application tier data dictionary also provides a means to store and maintain dependencies between application files and entities other than database objects. Once an application file has been analyzed and the associated dependencies recorded in the application tier data dictionary, programmers or other system personnel can identify the dependencies for a particular application file without having to run the complete analysis on the application file.

Thus, although there has been described to this point a particular embodiment for a method and apparatus for an application tier data dictionary, it is not intended that such specific references be considered as limitations upon the scope of this invention except in-so-far as set forth in the following claims.

What is claimed is:

1. A method of tracking dependencies in an application file, comprising:
   in a three-tier system having a client tier, an application tier and a database tier, populating an application tier data dictionary with information from a database tier data dictionary;
   analyzing the application file to identify at least one dependency in the application file wherein each dependency of the at least one dependency is a connection between the application file and at least one entity, wherein the at least one entity is one of a data source, data object, other application file, or a supplemental file, associated file, and the application file resides on the application tier;
   extracting information from the application file related to the at least one dependency to allow identification of the at least one dependency from the extracted information;
   determining, based on the extracted information, whether the at least one dependency exists in the application tier data dictionary;
   in response to determining, updating the application tier data dictionary with the at least one entity if the at least one dependency exists, or storing the at least one dependency for the application file in the application tier data dictionary if the at least one dependency does not exist, wherein the application tier data dictionary is a repository located on the application tier, wherein the at least one dependency is stored in a table organized by the application file's name.

2. The method of claim 1, wherein analyzing the application file further comprises identifying strings within the application file.

3. The method of claim 2, wherein extracting information comprises:
   extracting the strings and converting each term in the string to a token; and
   accessing the application tier data dictionary comprises using the token to determine if the token represents one of either a database object or database synonym dependency.

4. The method of claim 3, wherein accessing an application tier data dictionary further comprises:
   determining that at least one hashmap collection in the application tier data dictionary has not been populated;
   accessing the database tier data dictionary using the token; and
   retrieving a portion of the database tier data dictionary associated with the token.

5. The method of claim 3, wherein accessing the application tier data dictionary using the token comprises using the token as an index into at least one hashmap collection.

6. The method of claim 1, wherein analyzing the application file comprises parsing the application file to locate at least one of an import statement or a subroutine call.

7. The method of claim 6, wherein extracting information comprises extracting at least one of a file, class or package name as the at least one entity to which the application file has a dependency.

8. The method of claim 7, wherein storing the at least one dependency further comprising storing at least one of the name of the file, class or package name associated with the application file in the application tier data dictionary.

9. The method of claim 1, wherein analyzing the application file comprises identifying a name of an associated file.

10. The method of claim 9, wherein extracting the information comprises extracting at least name of at least one of a data source, a file, a class, and another associated file from the associated file.

11. The method of claim 10, wherein storing the at least one dependency further comprises storing the name and associating the name with the application file in the application tier data dictionary.

12. A non-transitory computer-readable medium having stored thereon computer-readable instructions that, when executed, cause the computer to:
   in a three-tier system having a client tier, an application tier and a database tier, populating an application tier data dictionary with information from a database tier data dictionary;
   analyze the application file to identify at least one dependency in the application file, wherein each dependency of the at least one dependency is a connection between an application and at least one entity, wherein the at least one entity is one of a data source, data object, other application file, or a supplemental file, associated file, and the application file resides on the application tier;
   extract information from the application file related to the at least one dependency to allow identification of the at least one dependency from the extracted information;
   determine, based on the extracted information, whether the at least one dependency exists in the application tier data dictionary;
   in response to determining, update the application tier data dictionary with the at least one entity if the at least one dependency exists, or store the at least one dependency for the application file in the application tier data dictionary if the at least one dependency does not exist, wherein the application tier data dictionary is a repository located on the application tier, wherein the at least one dependency is stored in a table organized by the application file's name.

13. The computer-readable medium of claim 12, the instructions that cause the computer to analyze the application file further cause the computer to execute a lexical analyzer to locate strings in the application file.

14. The computer-readable medium of claim 13, the instructions that cause the computer to extract information further cause the computer to:
   extract each term from the strings in the application file; and
   use each term from the strings as a token.

15. The computer-readable medium of claim 12, the instructions that cause the computer analyze the application file cause the computer to parse the application file to locate file names used in one of either an import statement or a subroutine call.

16. The computer-readable medium of claim 12, the instructions that cause the computer to analyze the application file further cause the computer to identify a text file associated with the application file.

17. A system, comprising:
a memory, at a first tier, to store an application tier data dictionary and at least one application file, wherein the application tier data dictionary is a repository located on the application tier in a system having a client tier, an application tier and a database tier; and
a processor at the first tier to:
populate the application tier data dictionary on the application tier with information from the system data dictionary on the database tier;
analyze the at least one application file to identify at least one dependency in the at least one application file, wherein each dependency of the at least one dependency is a connection between an application and at least one entity, wherein the at least one entity is one of a data source, data object, other application file, or a supplemental file, associated file, and the application file resides on the application tier;
extract information from the at least one application file related to the at least one dependency to allow identification of the at least one dependency from the extracted information;
determine, based on the extracted information, whether the at least one dependency exists in the application tier data dictionary;
in response to determining, update the application tier data dictionary with the at least one entity if the at least one dependency exists, or store the at least one dependency for the at least one application file in the application tier data dictionary if the at least one dependency does not exist, wherein the application tier data dictionary is a repository located on the application tier, wherein the at least one dependency is stored in a table organized by the at least one application file's name.

18. The system of claim 17, further comprising a third tier, such that the processor is also to communicate with the third tier and to execute the at least one application file as requested by the third tier.

19. The system of claim 18, wherein the first tier comprises an application tier, the second tier comprises a database tier and the third tier comprises a client tier.

20. The system of claim 17, wherein the first tier comprises a client tier and the second tier comprises a server tier.

* * * * *